(No Model.)
B. F. & C. O. METZLER.
STEAM COOKER.
No. 509,543. Patented Nov. 28, 1893.
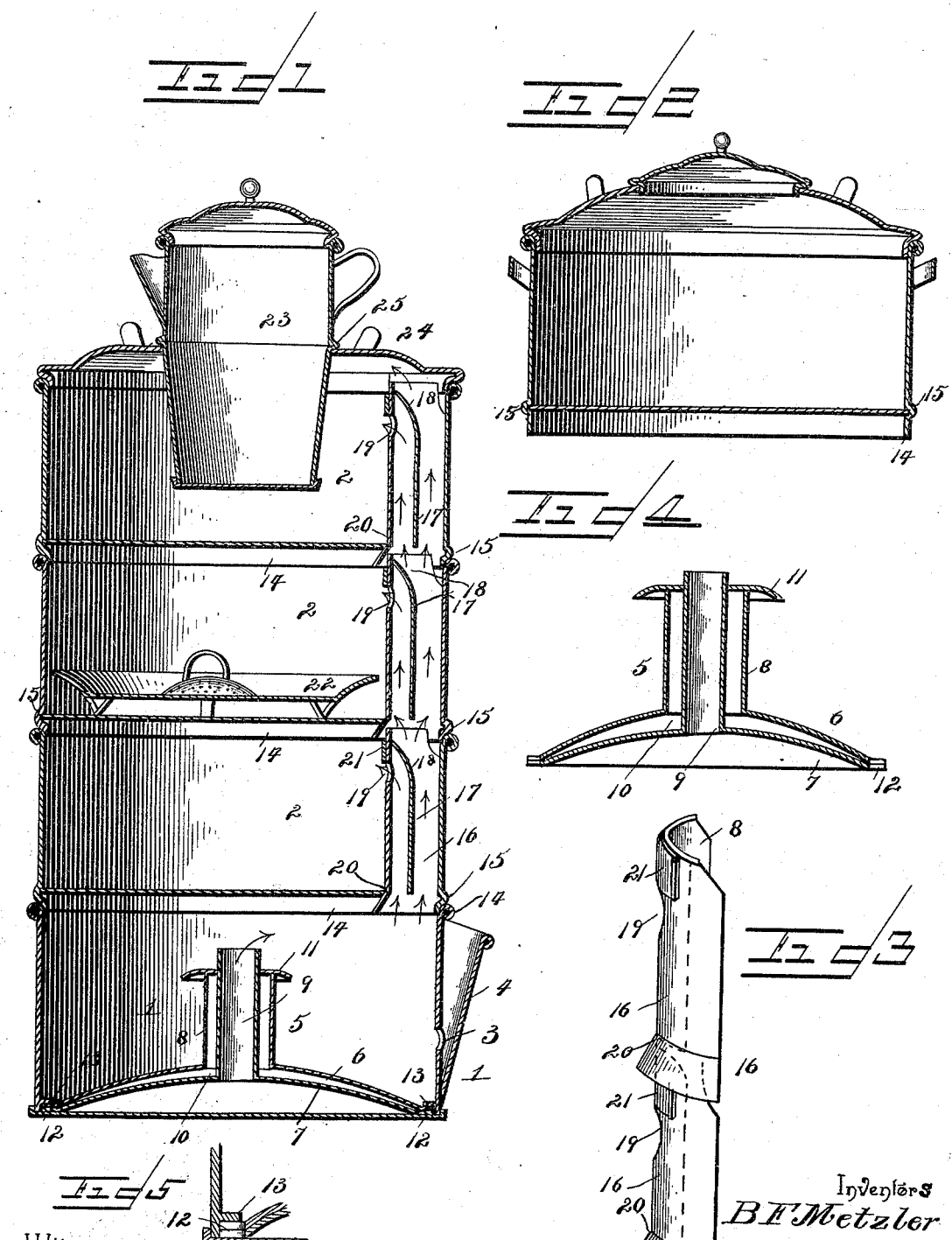
Witnesses
W. E. Schneider
N. F. Riley
Inventors
B. F. Metzler
C. O. Metzler
By their Attorneys,
C. A. Snow & Co.

UNITED STATES PATENT OFFICE.

BENJAMIN F. METZLER AND CHARLES O. METZLER, OF HOLDEN, MISSOURI.

STEAM-COOKER.

SPECIFICATION forming part of Letters Patent No. 509,543, dated November 28, 1893.

Application filed April 4, 1893. Serial No. 469,069. (No model.)

*To all whom it may concern:*

Be it known that we, BENJAMIN FRANKLIN METZLER and CHARLES OTHER METZLER, citizens of the United States, residing at Holden, in the county of Johnson and State of Missouri, have invented certain new and useful Improvements in Steam-Cookers, of which the following is a specification, reference being had therein to the accompanying drawings.

The invention relates to improvements in steam cookers.

The object of the present invention is to provide a device of simple and inexpensive construction in which a maximum amount of space may be obtained for cooking purposes, and in which steam may be rapidly generated and readily transmitted to different cooking vessels without liability of mixing the flavors of the various articles cooking.

The invention consists in the construction and novel combination and arrangement of parts hereinafter fully described, illustrated in the accompanying drawings and pointed out in the claims hereto appended.

In the drawings—Figure 1 is a vertical sectional view of a steam cooker constructed in accordance with this invention. Fig. 2 is a detail vertical sectional view of one of the cooking vessels or sections. Fig. 3 is a detail perspective view, showing the construction of the steam tubes. Fig. 4 is a detail sectional view of the steam generator. Fig. 5 is a detail sectional view illustrating the manner of securing the steam generating device in the boiler.

Like numerals of reference indicate corresponding parts in all the figures of the drawings.

1 designates the bottom section or vessel of a vertical series adapted to contain water and to serve as a boiler for generating steam to be conducted to the other sections 2 of the vertical series constituting the cooker. The boiler section 1 is provided at one side with an opening 3 and has a spout 4 receiving the opening and enabling water to be readily supplied to the boiler without removing the other sections, and also enabling the height of the water in the boiler to be readily ascertained.

A steam generating device 5 is arranged in the boiler on the bottom thereof to hasten the generation of steam, and it consists of two concavo-convex disks 6 and 7 and concentric tubes 8 and 9, connected respectively with the concavo-convex disks, whereby an intervening space 10 is formed to provide an air jacket to separate the water within the steam generator from the body of the water outside of it to enable the water to boil rapidly. The air-jacket space 10 is closed at the top by an annular flange 11, having a downwardly inclined outer edge.

The disks 6 and 7, which are secured together at their peripheries, are provided thereat at diametrically opposite points with recesses 12 adapted to permit the device to engage projections 13 of the boiler 1. The device is placed in the boiler with the recesses adjacent to the projections, and after the peripheries of the disks are below the projections the device is turned to carry the recesses 12 away from the projections. The water in the boiler 1, outside of the steam generating device, passes under the disks and fills the device and maintains it so.

The superimposed sections 2, which are constructed of suitable material, are separate and independent, and are fitted into and upon one another by means of a rim or flange 14 at the lower edge of each section or vessel. This rim or flange 14 is slightly smaller in diameter than the internal diameter of the sections or vessels 2 to fit into the same; and the sections or vessels 2 are prevented from entering too far into one another by outwardly extending annular flanges 15, arranged at the upper terminus of the flanges 14. Steam is conducted from the boiler 1 to the sections or vessels 2 by semi-cylindrical tubes 16, arranged within the latter and provided each with a longitudinal partition 17, which divides the tube into two passages. The upper end 18 of the partition is curved inwardly to close the inner passage at the top, and the tube 16 is provided with an opening 19 affording communication between the inner tube and the adjacent section or vessel 2. The lower end 20 of the cylindrical tube is secured over a semi-cylindrical opening in the bottom of the containing section or vessel; it is arranged vertically and is secured to the section or vessel by soldering or otherwise, and its lower end is provided with a flared flange which depends below the bottom of the section or vessel and receives the upper end of the tube next below it and which may be integral with the tube or separate. By this construction a continuous steam passage is provided from the top of the boiler to the top of the uppermost section or vessel, and separate passages are provided leading to the different sections or vessels to prevent the various flavors from mixing.

A slide 21 is mounted on the tube and is arranged to close the opening 19 to shut out the steam from one or more sections or vessels, when it is desired to cook by heat alone.

A perforated false bottom or support 22 may be employed in any of the vessels 2 to keep certain articles of food above the water of condensation, which collects on the bottoms of the sections or vessels.

A pot or vessel 23 for steeping tea and coffee is supported by the top section or vessel 2, and extends through an opening in a cover 24 of the same. The lower half of the pot or vessel 23 is made slightly tapering from a flange 25 to its bottom; and the pot or vessel 23 can be readily adjusted to its seat, and is prevented from sliding through the cover by the flange 25.

It will be seen that the cooker is simple, inexpensive and effective, that a maximum amount of space is provided for cooking, that the cooking sections are interchangeable, that the steam may or may not be employed in any particular cooking section or vessel, and that the flavors are not mixed.

Change in the form, proportion and minor details of construction may be resorted to without departing from the spirit or sacrificing any of the advantages of this invention.

Having described our invention, what we claim is—

1. A steam cooker comprising a series of interchangeable sections each provided with a vertically disposed semi-cylindrical tube secured to the inner face of a section and forming with the same a complete tube and having an opening and provided with a longitudinal partition forming inner and outer steam passages and having its upper end closing the inner passage, said tube being provided at its lower end with a flaring flange depending below the bottom of its section, substantially as described.

2. A steam cooker comprising a bottom boiler section, a series of superimposed interchangeable cooking sections or vessels each provided on its interior with a vertically-disposed semi-cylindrical tube secured to the side of its section or vessel and having an opening near its upper end and provided with a longitudinal partition forming inner and outer steam passages and having its upper end closing the inner passage above said opening, said tube being provided at its lower end with a flaring flange depending below the bottom of its section, and slides for closing the opening near the upper ends of the tubes, substantially as described.

In testimony whereof we affix our names in presence of two witnesses.

BENJAMIN F. METZLER.
    CHARLES O. METZLER.

Witnesses:
 W. W. GAUNT,
 I. NICHOLS.